United States Patent
Baumgartner et al.

(10) Patent No.: US 12,202,027 B2
(45) Date of Patent: Jan. 21, 2025

(54) METHOD FOR PRODUCING A PLURALITY OF COMPOSITE STRUCTURES

(71) Applicant: Uniflex-Hydraulik GmbH, Karben (DE)

(72) Inventors: Carsten Baumgartner, Laubach (DE); Hubert Poth, Friedberg (DE)

(73) Assignee: Uniflex-Hydraulik GmbH, Karben (DE)

( * ) Notice: Subject to any disclaimer, the term of this patent is extended or adjusted under 35 U.S.C. 154(b) by 749 days.

(21) Appl. No.: 17/487,816

(22) Filed: Sep. 28, 2021

(65) Prior Publication Data
US 2022/0016686 A1 Jan. 20, 2022

Related U.S. Application Data

(63) Continuation of application No. PCT/EP2020/058605, filed on Mar. 26, 2020.

(30) Foreign Application Priority Data

Mar. 29, 2019 (DE) ...................... 10 2019 108 242.0

(51) Int. Cl.
*B21D 39/04* (2006.01)
*G05B 19/042* (2006.01)
(Continued)

(52) U.S. Cl.
CPC ......... *B21D 39/04* (2013.01); *G05B 19/0426* (2013.01); *G05B 2219/23406* (2013.01); *H04L 67/12* (2013.01); *H04W 4/80* (2018.02)

(58) Field of Classification Search
CPC ................ B21D 39/04; G05B 19/0426; G05B 2219/23406; G05B 2219/23296;
(Continued)

(56) References Cited

U.S. PATENT DOCUMENTS

2015/0287318 A1* 10/2015 Nair ....................... G06Q 10/10
340/5.6
2017/0308050 A1* 10/2017 Matergia ............ G05B 19/0426

FOREIGN PATENT DOCUMENTS

DE 3513129 A1 10/1986
DE 3611253 C2 3/1989
(Continued)

OTHER PUBLICATIONS

International Search Report issued for corresponding International Patent Application No. PCT/EP2020/058605 mailed on Jun. 19, 2020.

*Primary Examiner* — Michael J Brown
(74) *Attorney, Agent, or Firm* — Myers Wolin, LLC

(57) ABSTRACT

A method is provided for joining structures, where at least one of the components to be joined is individually plastically deformed in a radial press. A control unit for the radial press has a PLC machine controller and a BTLE communication module and a mobile terminal is associated. Mobile terminals are designed to communicate with a central server via a mobile data network, which central server is equipped with a pressing program memory. Configuration programs used to set up associated radial presses are stored on the mobile terminals. Each radial press is set up by means of the associated mobile terminal, specifically by configuration of the PLC machine controller by means of a specific pressing program in accordance with program-specific data retrieved from the central server for a particular lot. Within the lot, each individual radial deformation process is triggered by triggering means arranged on the radial press itself.

14 Claims, 2 Drawing Sheets

(51) Int. Cl.
  *H04L 67/12*   (2022.01)
  *H04W 4/80*   (2018.01)
  *B30B 7/04*   (2006.01)
  *G05B 19/04*   (2006.01)

(58) Field of Classification Search
  CPC ........ H04L 67/12; H04W 4/80; H04W 88/06;
   B30B 7/04
  USPC ....................................................... 700/206
  See application file for complete search history.

(56)      References Cited

FOREIGN PATENT DOCUMENTS

| | | |
|---|---:|---:|
| DE | 4135465 A1 | 4/1993 |
| DE | 19944141 C1 | 1/2001 |
| DE | 29824688 U1 | 8/2002 |
| DE | 10149924 A1 | 4/2003 |
| DE | 102005034260 B3 | 7/2006 |
| DE | 102005041487 A1 | 4/2007 |
| DE | 60121915 T2 | 8/2007 |
| DE | 19940744 B4 | 11/2008 |
| DE | 102009057726 A1 | 6/2011 |
| DE | 102011015654 A1 | 10/2012 |
| DE | 102011015705 A1 | 10/2012 |
| DE | 102011015770 | 10/2012 |
| DE | 102014012485 B3 | 9/2015 |
| DE | 102014014585 B3 | 10/2015 |
| DE | 102014008613 A1 | 12/2015 |
| DE | 202016100660 U1 | 3/2016 |
| DE | 202016008097 U1 | 3/2017 |
| DE | 102016106650 A1 | 10/2017 |
| EP | 2927854 A1 | 10/2015 |
| EP | 3012695 A1 | 4/2016 |
| WO | 2018185717 A1 | 10/2018 |

\* cited by examiner

METHOD FOR PRODUCING A PLURALITY OF COMPOSITE STRUCTURES

CROSS REFERENCE TO RELATED APPLICATIONS

This application is a continuation under 35 U.S.C. § 120 of International Application PCT/EP2020/058605, filed Mar. 26, 2020, which claims priority to German Application No. 10 2019 108 242.0, filed Mar. 29, 2019, the contents of each of which are incorporated by reference herein.

FIELD OF THE INVENTION

The present invention relates to a method for the manufacture of a plurality of composite structures by joining, carried out in a radial press, respectively at least two components, respectively with plastic radial deformation at least of one of the components involved.

BACKGROUND

It is known that, by plastic radial deformation at least of one component, carried out in a radial press, the said component can be joined with a further component to obtain a composite structure. A very common example of this is the manufacture of ready-to-install hose lines for hydraulic applications. For this purpose it is customary to securely attach connection fittings to both ends of a hose piece by means of radial deformation. These connection fittings comprise—as two components that are separate or else have already been joined to one another as a so-called "one-piece fitting"—a nipple and a sleeve, wherein the nipple is inserted internally into the end portion of the hose piece and the sleeve surrounds these on the outside, so that the end portion of the hose piece is situated in an annular space between the nipple and the sleeve. In the radial press, the sleeve is plastically deformed in radially inward direction, so that the end portion of the hose piece is securely crimped between it and the nipple. As an example, DE 36 11 253 C2 constitutes relevant prior art in this respect. Further examples of radial presses that can be used in connection with the method mentioned in the introduction for the manufacture of composite structures can be found in DE 20 2016 100 660 U1, DE 20 2016 008 097 U1, DE 10 2016 106 650 A1, DE 10 2014 014 585 B3, DE 10 2014 012 485 B3, DE 10 2014 008 613 A1, DE 10 2011 015 770 A1, DE 10 2011 015 654 A1, DE 10 2009 057 726 A1, DE 10 2005 041 487 A1, DE 10 2005 034 260 B3, DE 601 21 915 T2, DE 298 24 688 U1, DE 199 44 141 C1, DE 199 40 744 B4, DE 101 49 924 A1, DE 41 35 465 A1 and DE 35 13 129 A1.

The composite structures (e.g. hydraulic hose lines) joined by application of the manufacturing method relevant here, i.e. with plastic radial deformation at least of one of the components involved, have the features that, after the joining process, typically at least one of the components is disposed inside another component (e.g. the nipple inside the hose, and the hose in turn inside the sleeve). Thus an optical or visual inspection of the respectively manufactured joint is typically impossible. This means that, because of particular features of the specific manufacturing method, possible defects of the finished-joined composite structure can often be detected only on this itself with relatively laborious test methods (e.g. individual pressure test of each individual hydraulic line). In addition, highly demanding applications, some of which are even extremely critical to safety, are often involved during implementation of the method under consideration here for composite structures (such as high-pressure hose lines) manufactured by plastic radial deformation. In the absence of a laborious inspection in the above sense, it is entirely possible—depending on the individual application—for a considerable hazard to issue from the composite structures manufactured by plastic radial pressing at least of one of the components involved in the manner depicted in the introduction.

In view of this, the present invention is aimed at making a contribution to an improvement of safety during implementation of the method mentioned in the introduction in industrial practice.

SUMMARY

This object may be achieved according to the present invention by methods specified in the claims. Accordingly, the method depicted in the introduction is, by its nature, characterized according to the invention in that it takes place by use of a system comprising a plurality of radial presses installed at different locations, at which
- the radial presses are respectively provided with a control unit equipped with a PLC machine controller and a BTLE communication module,
- a mobile terminal unit suitable for communication with the BTLE communication module of the radial press in question is associated with each radial press,
- the mobile terminal units are set up for communication via a mobile data network with a central server, which is installed at yet another location and is equipped with a program memory wherein
- configuration programs used for setup of the respectively associated radial press are stored on the mobile terminal units,
- the respective radial press is set up via the associated mobile terminal unit for a lot comprising a plurality of similar radial deformation processes, and specifically by configuration of the PLC machine controller by means of a specific press program that takes into consideration program-specific data called in relation to the lot by the mobile terminal unit from the central server, and
- the respective individual radial deformation process within the lot in question is triggered by triggering means disposed on the radial press itself.

The inventive process control, which is characterized by several viewpoints interacting with one another in synergetic combinatorial relationship, permits—by comparison with the currently achieved prior art—a plurality of advantages, some having quite considerable scope with relevance to safety. What must be emphasized in particular is the setup—which takes place prior to implementation of a lot comprising a plurality of similar radial deformation processes—of the respective radial press via a mobile terminal unit, which on the one hand communicates—via the BTLE standard (Bluetooth Low Energy)—with the control unit of the radial press in question, and on the other hand—via a mobile data network—with a central server having a program memory. In this way, the most up-to-date press-process-related data and information called from the central server can be taken into consideration during setup of the radial press in question with respect to the press order that is specifically to be processed and is defined in particular by the respective individual pair of components to be joined (e.g. special hose piece and special connection fitting). This concerns not only the press parameters—related to the pressing process to be performed—in the narrower sense, such as pressing force/ pressing pressure, press size, pressing speed, etc. To the contrary, warnings based in particular even on the most recent/current empirical knowledge obtained on another radial press connected to the system or in some other way can be provided by the central server, for example concerning a possible long-term incompatibility of certain components that can be joined with one another, in the sense that the pair in question has not proved sufficiently reliable or possible to control in tests or in industrial practice.

Thus, by implementation of the present invention, setup of the respective radial press in a manner optimized from the security viewpoint does not suffer from the disadvantage of the possibility of sabotage or possible corruptibility of the radial press in question or susceptibility to being contaminated with malware. This is so because the radial presses linked to the system do not have to be connected or connectable directly to the Internet or to an operational W-LAN. Since the radial presses cannot be activated directly via the Internet or an operational W-LAN for their setup in this sense, but are set up exclusively via the respectively associated mobile terminal unit, which communicates with the radial press via BTLE, an otherwise possible "gateway" for defective setup—intentional or unintentional—is blocked.

Due to the lot-related setup—which takes place via the respectively associated mobile terminal unit and in a certain sense is acute—of the radial presses integrated in the system while taking data called from the central server into consideration, it is additionally possible to ensure that different press programs, from which the operator selects one, are not stored—on a corresponding memory unit—in the control units of the radial presses. This contributes to reducing the hazard of faulty operation, thus representing an additional safety-relevant aspect permitted by the present invention. In addition, it constitutes the economic benefit that the respective radial press can be of correspondingly simpler design. This is so because not only can the control units provided for the radial presses be "slimmed down" in the narrower sense, but so also can associated input and output units. Within the scope of the invention, the radial presses typically manage to perform with a minimal display. In particular, there is no need for a touch display.

In contrast to the setup of the respective radial press, however, triggering of the respective individual radial deformation process does not take place, within the scope of the present invention, via the respective associated mobile terminal unit. To the contrary, this takes place—especially in the interests of high safety for the users—via a triggering means disposed on the radial press itself. This may be in particular an actuating means (such as hand-operated switch, foot pedal or the like) that can be manually actuated by an operator. Especially if the radial press in question is part of an automated assembly bay, however, machine-internal triggering means are also a possibility. These include in particular triggering of the respective individual radial deformation processes on the radial press in question by its machine controller in dependence on specific machine-related input signals, such as can be provided, for example, by correct automatic equipping of the radial press in question with the sensors that monitor the components to be joined and/or are relevant to safety.

According to a preferred further development of the invention, a further configuration program suitable for setup of further different radial presses is respectively stored on the mobile terminal units comprised by the system. Thus the explained advantages attainable with the invention are particularly noticeable, because several radial presses (installed in the establishment in question) can be set up with one mobile terminal unit. Due to the limitation, made possible hereby, of the number of mobile terminal units reserved for setup of the radial presses in the establishment in question, the risk of an unacceptable influence on the radial presses is minimized. In this connection, it is quite particularly advantageous when the system comprises radial presses of different kinds, wherein the configuration programs of all mobile terminal units are identical. The possibility of setting up several radial presses via a single mobile terminal unit using a single configuration program may likewise make a contribution to reducing the danger of faulty operation.

Particularly preferably, the system-internal mobile terminal units are respectively provided with a component data memory, which can be activated via the associated configuration program. This is where the data are resident for the components to be processed with the radial presses integrated in the system. Likewise it is possible, for certain component pair, to save the respective data and process parameters that characterize the respective pressing operation (e.g. pressing force/pressing pressure, press size, pressing speed, etc.). These may be verified or modified if necessary via data query from the central server.

Nevertheless, decentralized storage of component data on a component data memory of the respective mobile terminal unit is in no way indispensable for this purpose. To the contrary: In a particularly preferred configuration of the invention, the component data are also resident on a memory unit of the central server. This is the case in particular when the components to be processed within the inventive method respectively have a readable coding (e.g. barcode or transponder) that unambiguously identifies them and the mobile terminal units are provided with respectively a transducer or a read interface (e.g. camera or RFID antenna), via which the component codings can be read in. The component codings of the component pair to be joined are then transmitted from the mobile terminal unit in question to the central server, so that the press-program-specific data called from this by the mobile terminal unit and taken into consideration for setup of the radial press in question reliably relate exactly to the component pair in question. This configuration is intrinsic to a particularly high safety standard, because erroneous inputs are excluded.

According to yet another preferred further development of the invention, the mobile terminal unit delivers its own position data to the central server at the same time as it is calling data from it that are associated with the configuration of the radial press in question. These can be processed by the central server for verification purposes. In a configuration that is particularly preferred in this respect, the verification consists in comparison of the delivered position of the mobile terminal unit with position data that are resident in a press memory of the central server for the radial presses connected to the system. If the comparison shows that the position data of the mobile terminal unit deviate from the position data resident in the press memory for the radial press to be set up by the mobile terminal unit, this may be regarded as a sign of an irregularity (e.g. theft of a machine) and appropriately processed, for example by denying setup of the radial press.

Yet another preferred further development of the invention is characterized in that the central server is equipped with a production memory, wherein data of the radial deformation processes taking place on the respective radial press within the lot in question are transmitted via the BTLE communication link from the machine controller to the mobile terminal unit and from there via the mobile data network to the central server. In this way the central server automatically documents all pressing operations performed on the radial presses associated with the system. This is an eminently significant advantage for assurance of quality standards under existing certifications. Furthermore, the corresponding documentation of the machine use on the central server may be used for monitoring compliance with service or maintenance intervals. Specifically, setup of the machine in question may be denied—in each case for selected radial presses operating under stricter safety standards—until required service or maintenance tasks have been completed or their completion has been confirmed. Once again, an entirely considerable safety-related gain is achieved.

Especially in connection with the foregoing further development of the invention, it is very advantageous for the central server to be provided with a service data memory containing stored service instructions that can be called by the mobile terminal units. In this way entirely specific, individual instructions can be communicated to the operator on his/her mobile terminal unit for service and maintenance tasks pending for the respective machine. Inadvertent faulty maintenance—for example performed on the basis of a manual belonging to a different radial press—can be excluded hereby. Once again, the safety-related gain is quite considerable.

Likewise the documentation, explained hereinabove, of the machine use on the central server can be used for possible determination of usage fees related to the use and dependent on the scope of use of the respective radial press. Particularly preferably, such a use-related usage fee can then already be determined in advance by the central server in response to the call for data—specific for a particular lot size—from the central server by the mobile terminal unit and communicated to the mobile terminal unit, wherein the delivery of the radial press configuration data from the central server to the mobile terminal unit may be made dependent in this case on confirmation, on the mobile terminal unit, of the forecast incurred costs.

From the foregoing explanations, it is evident that structural features, by which the system used for carrying out the inventive method is distinguished, also play a role for implementation of the present invention. Preferred further developments of the system are derived directly from the foregoing explanations of the inventive method.

BRIEF DESCRIPTION OF THE DRAWING

A preferred further development of the present invention will be explained in more detail hereinafter on the basis of a preferred exemplary embodiment illustrated in the drawing, wherein.

DETAILED DESCRIPTION OF THE PREFERRED EMBODIMENTS

Figure 1:
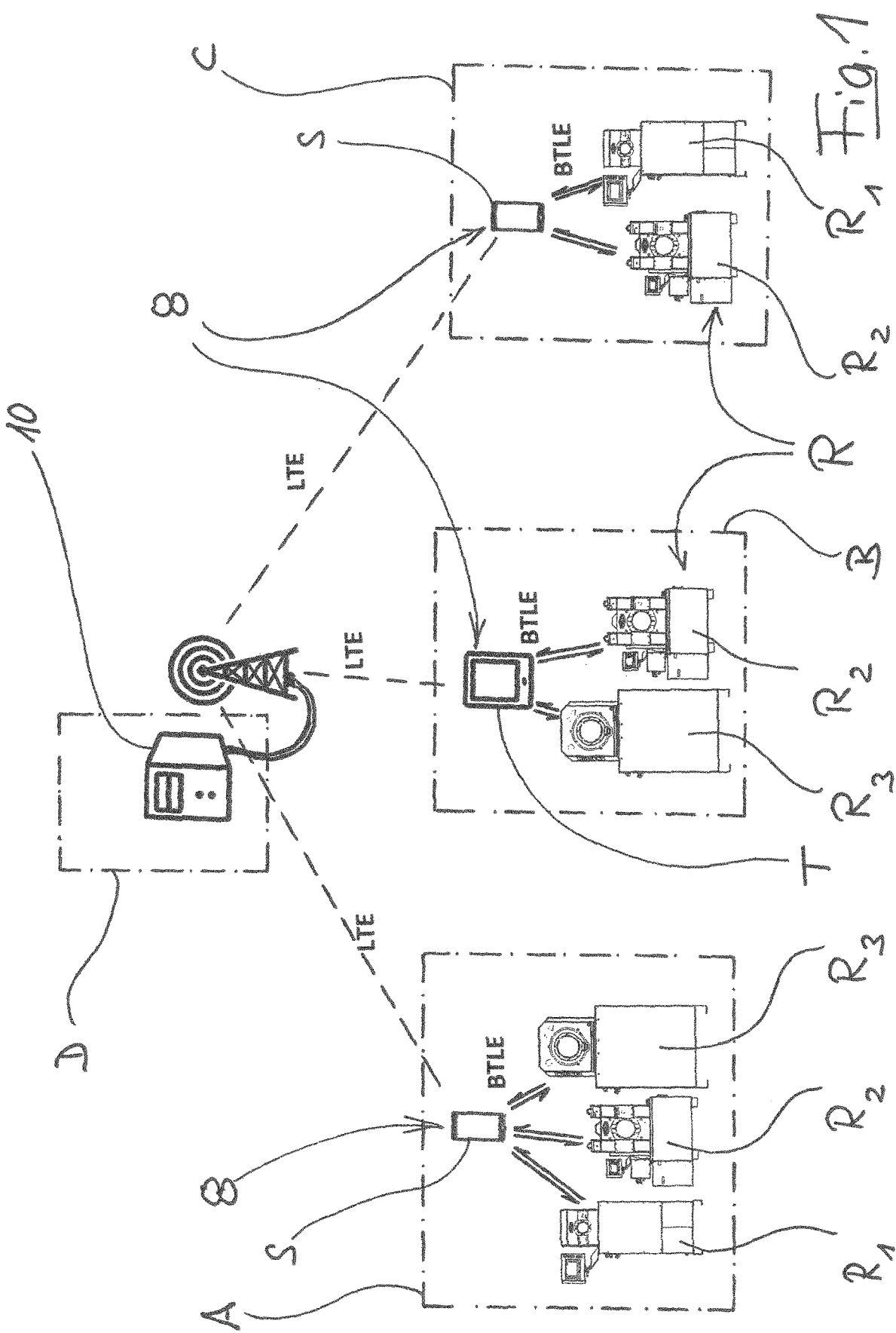
FIG. 1 shows, in a schematic diagram, a system arranged for implementation of the inventive method.

According to FIG. 1, the system comprises diverse radial presses R installed at different locations A, B, C, namely a radial press of type $R_1$, a radial press of type $R_2$ and a radial press of type $R_3$ at a first location A, a radial press of type $R_2$ and a radial press of type $R_3$ at a second location B and a radial press of type $R_1$ and a radial press of type $R_2$ at a third location C. The three locations A, B and C are to be understood here as three different, spatially separated operating facilities. Radial presses $R_1$, $R_2$ and $R_3$ are respectively suitable and arranged for the manufacture of hydraulic lines by attachment of two connection fittings 3—respectively having a nipple 1 and a sleeve 2—to the ends of a hose piece 4 (see FIG. 2).

Figure 2:
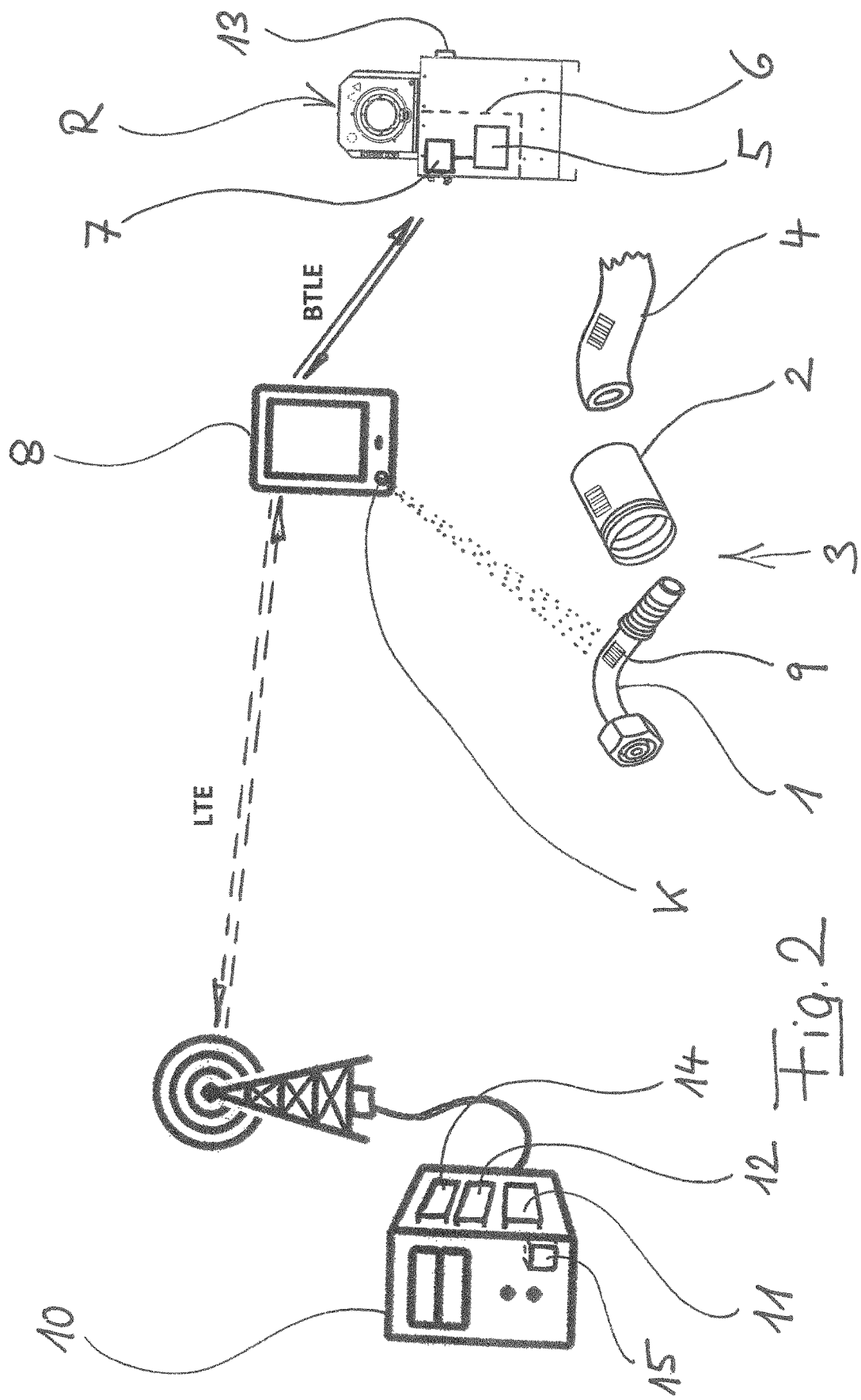
FIG. 2 illustrates detailed aspects of the system according to FIG. 1.

Each of the radial presses R has, in a manner known as such, a control unit 6 equipped with a PLC machine controller 5 (see FIG. 2). This is further equipped respectively with a BTLE communication module 7, which permits communication, taking place via the "Bluetooth Low Energy" (BTLE) standard, with a mobile terminal unit 8, i.e. especially a smartphone S or a tablet T. At least one such mobile terminal unit 8 exists at each of the three sites A, B and C, and respectively one configuration program suitable for setup of all radial presses R installed at the site A, B or C in question is respectively stored on it.

These mobile terminal units 8 are respectively provided with a camera K, by means of which optically readable codings 9, which are present on nipple 1, on sleeve 2 and on hose piece 4 and which unambiguously identify the component in question, can be read into mobile terminal unit 8.

In order to set up the respective radial press R automatically—by appropriate programming of the PLC machine controller 5—the associated mobile terminal unit 8 in question refers back to a central server 10 reserved at yet another location D. This communication between the respective mobile terminal unit 8 and central server 10 takes place via a mobile data network (mobile radio) according to an established standard, for example LTE. Within the scope of the configuration program stored on it, the mobile terminal unit 8 in question then calls an individual order-specific press program from central server 10, namely from its program memory 11, and installs this—using BTLE communication—on the radial press R in question, i.e. programs its PLC machine controller 5 according to the configuration data delivered from central server 10. The program call directed from mobile terminal unit 8 to central server 10 then defines the specific individual press task for which the appropriate press program is to be installed on the radial press R in question, on the basis on the one hand of the machine data individualizing the respective radial press R currently communicating with mobile terminal unit 8 and on the other hand of the component codings 9, read in via camera K and individualizing nipple 1, sleeve 2 and hose 4. For control purposes, mobile terminal unit 8 also delivers its location data to central server 10 during the respective program call.

Central server 10 is provided with a component memory 12 containing data about the components, which are identifiable via their respective coding 9. A plausibility check matched to the specific program call (see above) is applied in central server 10, especially with respect to the compatibility of the components—hose 4, nipple 1 and sleeve 2—respectively being combined with one another. If the result of the check is positive, the press program to be installed is delivered via mobile radio to mobile terminal unit 8 and from this by BTLE to the specific radial press R. If the result of the plausibility check is negative, however, central server 10 sends a corresponding message or warning to the mobile terminal unit 8 in question.

Triggering of the respective individual radial deformation process in order to join the respective three components securely and inseparably to one another as a composite (in this case a hydraulic line) by plastic deformation of sleeve 2 according to the installed press program then takes place— within the lot in question—respectively by triggering means 13 disposed on the radial press (R) itself. In this exemplary embodiment, these are designed as actuating means in the form of a pushbutton, to be actuated manually by the operator of radial press R.

Central server 10 is further provided with a production memory 14. This is where the data of all radial deformation processes taking place on the respective radial press R are stored. In addition, these production data are transmitted via the BTLE communication link from machine controller 5 to mobile terminal unit 8 and from this via the mobile data network to central server 10. Part of those production data delivered to central server 10 and resident there in production memory 14 may also be, in particular, measurement or test data acquired via separate transducers on the respective workpiece.

Furthermore, central server 10 is provided with a service data memory 15, in which service instructions for all individually registered radial presses R associated with the system are stored. These can be called by the respectively associated mobile terminal unit 8 or—taking into consideration service plans resident for the individual radial presses R—are delivered actively to the respectively associated mobile terminal unit 8.

What is claimed is:

1. A method for the manufacture of a plurality of composite structures by joining, carried out in a radial press (R), respectively at least two components, respectively with plastic radial deformation at least of one of the components involved, wherein the method takes place by use of a system comprising a plurality of radial presses (R) installed at different locations (A, B, C), at which
   the radial presses (R) are respectively provided with a control unit (6) of a plurality of control units equipped with a PLC machine controller (5) and a BTLE communication module (7),
   a mobile terminal unit (8) of a plurality of mobile terminal units suitable for communication with the BTLE communication module (7) of the radial press (R) in question is associated with each radial press (R),
   the mobile terminal units (8) are set up for communication via a mobile data network with a central server (10), which is installed at yet another location (D) and is equipped with a press program memory (11),
wherein
   configuration programs used for setup of the respectively associated radial press (R) are stored on the mobile terminal units (8),
   the respective radial press (R) is set up via the associated mobile terminal unit (8) for a lot comprising a plurality of similar radial deformation processes, and specifically by configuration of the PLC machine controller (5) by means of a specific press program that takes into consideration program-specific data called in relation to the lot by the mobile terminal unit (8) from the central server (10), and
   the respective individual radial deformation process within the lot in question is triggered by triggering means (13) disposed on the radial press (R) itself.

2. The method of claim 1, wherein the control units (6) of the radial presses (R) are not provided with memory units suitable for the storage of a plurality of press programs.

3. The method of claim 1, wherein respectively one configuration program suitable for setup of further different radial presses (R) is stored on the mobile terminal units (8).

4. The method of claim 1, wherein the system comprises radial presses (R) of different kinds ($R_1$, $R_2$, $R_3$), wherein the configuration programs of all mobile terminal units (8) are identical.

5. The method of claim 1, wherein the mobile terminal units (8) are respectively provided with a component data memory, to which the respective configuration program has access.

6. The method of claim 1, wherein the components respectively have a contactlessly readable coding of a plurality of component codings that identifies them unambiguously and the mobile terminal units (8) are provided respectively with a transducer, via which the component codings (9) are readable, wherein the component codings (9) of the component pair to be respectively joined are transmitted from the mobile terminal unit (8) in question to the central server (10).

7. The method of claim 6, wherein the contactlessly readable codings of the components are respectively an optically readable coding (9) and the transducers of the mobile terminal units are respectively a camera (K).

8. The method of claim 1, wherein the central server (10) is equipped with a production memory (14), wherein data of the radial deformation processes taking place on the respective radial press (R) within the lot in question are transmitted via the BTLE communication link from the machine controller (5) to the mobile terminal unit (8) and from there via the mobile data network to the central server (10).

9. The method of claim 8, wherein the data resident in the production memory (14) are used for automatic calculation of a use-related usage fee.

10. The method of claim 1, wherein an incurred use-related usage fee is determined by the central server in response to the call for data by the mobile terminal unit and is communicated to the mobile terminal unit, wherein the delivery of the radial press configuration data from the central server to the mobile terminal unit is made dependent on confirmation, on the mobile terminal unit, of the incurred costs.

11. The method of claim 1, wherein the mobile terminal unit (8) delivers its own position data to the central server (10) at the same time as it is calling data from it that are associated with the configuration of the radial press (R) in question.

12. The method of claim 1, wherein the radial presses (R) are not provided with any touch display.

13. The method of claim 1, wherein the central server (10) is provided with a service data memory (15) containing stored service instructions that can be called by the mobile terminal units (8).

14. A system comprising a plurality of radial presses (R) installed at different locations (A, B, C), for the manufacture of composite structures by joining respectively at least two components, by means of plastic radial deformation respectively at least of one of the components involved in one of the radial presses (R), wherein
   the radial presses (R) are respectively provided with a control unit (6) equipped with a PLC machine controller (5) and a BTLE communication module (7),
   a mobile terminal unit (8) of a plurality of mobile terminal units suitable for communication with the BTLE communication module (7) of the radial press (R) in question is associated with each radial press (R),
   the mobile terminal units (8) are set up for communication via a mobile data network with a central server (10), which is installed at yet another location (D) and is equipped with a program memory (11), configuration programs used for setup of the respectively associated radial press (R) are stored on the mobile terminal units (8), the respective radial press (R) can be set up via the associated mobile terminal unit (8) for a lot comprising a plurality of similar radial deformation processes, and specifically by configuration of the PLC machine controller (5) by means of a specific press program that takes into consideration program-specific data called in relation to the lot by the mobile terminal unit (8) from the central server (10), and triggering means (13) suitable for triggering the respective individual radial deformation process within the lot in question are disposed on the radial presses (R).

* * * * *